(12) United States Patent
Liu et al.

(10) Patent No.: US 7,099,860 B1
(45) Date of Patent: Aug. 29, 2006

(54) IMAGE RETRIEVAL SYSTEMS AND METHODS WITH SEMANTIC AND FEATURE BASED RELEVANCE FEEDBACK

(75) Inventors: Wen-Yin Liu, Beijing (CN); Hong-Jiang Zhang, Beijing (CN); Ye Lu, Burnaby (CA)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 09/702,292

(22) Filed: Oct. 30, 2000

(51) Int. Cl.
*G06F 17/30* (2006.01)

(52) U.S. Cl. ............. 707/3; 707/4; 707/5; 707/10
(58) Field of Classification Search ........... 707/3, 707/4, 5, 10, 103
See application file for complete search history.

(56) References Cited

U.S. PATENT DOCUMENTS

| | | | |
|---|---|---|---|
| 5,020,019 A | | 5/1991 | Ogawa |
| 5,579,471 A | * | 11/1996 | Barber et al. ............... 345/700 |
| 5,594,809 A | * | 1/1997 | Kopec et al. ............... 382/161 |
| 5,721,938 A | * | 2/1998 | Stuckey ........................ 704/4 |
| 5,870,754 A | * | 2/1999 | Dimitrova et al. ........ 707/104.1 |
| 5,899,999 A | * | 5/1999 | De Bonet ................ 707/104.1 |
| 5,995,978 A | * | 11/1999 | Cullen et al. ............ 707/104.1 |
| 6,076,088 A | | 6/2000 | Paik et al. |
| 6,092,080 A | * | 7/2000 | Gustman ................ 707/103 R |
| 6,285,995 B1 | * | 9/2001 | Abdel-Mottaleb et al. ..... 707/3 |
| 6,369,811 B1 | * | 4/2002 | Graham et al. ............. 707/512 |
| 6,442,538 B1 | * | 8/2002 | Nojima ......................... 707/1 |
| 6,504,571 B1 | * | 1/2003 | Narayanaswami et al. ............... 348/231.99 |
| 6,557,042 B1 | * | 4/2003 | He et al. ....................... 707/1 |
| 6,574,632 B1 | * | 6/2003 | Fox et al. .................... 707/102 |
| 6,728,706 B1 | * | 4/2004 | Aggarwal et al. ............. 707/5 |

OTHER PUBLICATIONS

Shevade et al., "an experiental annotation system", Year 2003, ISBA:1-508113, p. 91-98.*
Lai et al., "PBIR-MM: multimodal image retrieval and annotation", Year 2002, ISBN: 1-58113-620-X, p. 421-422.*

* cited by examiner

*Primary Examiner*—Jean M. Corrielus
*Assistant Examiner*—Baoquoc N To
(74) *Attorney, Agent, or Firm*—Lee & Hayes, PLLC

(57) ABSTRACT

An image retrieval system performs both keyword-based and content-based image retrieval. A user interface allows a user to specify queries using a combination of keywords and examples images. Depending on the input query, the image retrieval system finds images with keywords that match the keywords in the query and/or images with similar low-level features, such as color, texture, and shape. The system ranks the images and returns them to the user. The user interface allows the user to identify images that are more relevant to the query, as well as images that are less or not relevant to the query. The user may alternatively elect to refine the search by selecting one example image from the result set and submitting its low-level features in a new query. The image retrieval system monitors the user feedback and uses it to refine any search efforts and to train itself for future search queries. In the described implementation, the image retrieval system seamlessly integrates feature-based relevance feedback and semantic-based relevance feedback.

31 Claims, 6 Drawing Sheets

IMAGE RETRIEVAL SYSTEMS AND METHODS WITH SEMANTIC AND FEATURE BASED RELEVANCE FEEDBACK

TECHNICAL FIELD

This invention relates to image retrieval systems.

BACKGROUND

The popularity of digital images is rapidly increasing due to improving digital imaging technologies and easy availability facilitated by the Internet. More and more digital images are becoming available every day.

Automatic image retrieval systems provide an efficient way for users to navigate through the growing numbers of available images. Traditional image retrieval systems allow users to retrieve images in one of two ways: (1) keyword-based image retrieval or (2) content-based image retrieval. Keyword-based image retrieval finds images by matching keywords from a user query to keywords that have been manually added to the images. One of the more popular collections of annotated images is "Corel Gallery", an image database from Corel Corporation that includes upwards of 1 million annotated images.

One problem with keyword-based image retrieval systems is it can be difficult or impossible for a user to precisely describe the inherent complexity of certain images. As a result, retrieval accuracy can be severely limited because images that cannot be described or can only be described ambiguously will not be retrieved successfully. In addition, due to the enormous burden of manual annotation, there are few databases with annotated images, although this is changing.

Content-based image retrieval (CBIR) finds images that are similar to low-level image features of an example image, such as color histogram, texture, shape, and so forth. Although CBIR solves the problem of keyword-based image retrieval, it also has severe shortcomings. One drawback of CBIR is that searches may return entirely irrelevant images that just happen to possess similar features. Additionally, individual objects in images contain a wide variety of low-level features. Therefore, using only the low-level features will not satisfactorily describe what is to be retrieved.

To weed out the irrelevant images returned in CBIR, some CBIR-based image retrieval systems utilize user feedback to gain an understanding as to the relevancy of certain images. After an initial query, such systems estimate the user's ideal query by monitoring user-entered positive and negative responses to the images returned from the query. This approach reduces the need for a user to provide accurate initial queries.

One type of relevance feedback approach is to estimate ideal query parameters using only the low-level image features. This approach works well if the feature vectors can capture the essence of the query. For example, if the user is searching for an image with complex textures having a particular combination of colors, this query would be extremely difficult to describe but can be reasonably represented by a combination of color and texture features. Therefore, with a few positive and negative examples, the relevance feedback process is able to return reasonably accurate results. On the other hand, if the user is searching for a specific object that cannot be sufficiently represented by combinations of available feature vectors, these relevance feedback systems will not return many relevant results even with a large number of user feedbacks.

Some researchers have attempted to apply models used in text information retrieval to image retrieval. One of the most popular models used in text information retrieval is the vector model. The vector model is described in such writings as Buckley and Salton, "Optimization of Relevance Feedback Weights," in Proc of SIGIR'95; Salton and McGill, "Introduction to Modern Information Retrieval," McGraw-Hill Book Company, 1983; and W. M. Shaw, "Term-Relevance Computation and Perfect Retrieval Performance," Information processing and Management. Various effective retrieval techniques have been developed for this model and many employ relevance feedback.

Most of the previous relevance feedback research can be classified into two approaches: query point movement and re-weighting. The query point movement method essentially tries to improve the estimate of an "ideal query point" by to moving it towards good example points and away from bad example points. The frequently used technique to iteratively improve this estimation is the Rocchio's formula given below for sets of relevant documents DR and non-relevant documents $D'_N$ noted by the user:

$$Q' = \alpha Q + \beta \left( \frac{1}{N_{R'}} \sum_{i \in D'_R} D_i \right) - \gamma \left( \frac{1}{N_{N'}} \sum_{i \in D'_N} D_i \right) \quad (1)$$

where $\alpha$, $\beta$, and $\gamma$ are suitable constants and $N_{R'}$, and $N_{N'}$ are the number of documents in $D'_R$ and $D'_N$ respectively. This technique is implemented, for example, in the MARS system, as described in Rui, Y., Huang, T. S., and Mehrotra, S. "Content-Based Image Retrieval with Relevance Feedback in MARS," in Proc. IEEE Int. Conf. on Image proc., 1997.

The central idea behind the re-weighting method is very simple and intuitive. Since each image is represented by an N dimensional feature vector, the image may be viewed as a point in an N dimensional space. Therefore, if the variance of the good examples is high along a principle axis j, the values on this axis are most likely not very relevant to the input query and a low weight $w_j$ can be assigned to the axis. Therefore, the inverse of the standard deviation of the $j^{-th}$ feature values in the feature matrix is used as the basic idea to update the weight $w_j$. The MARS system mentioned above implements a slight refinement to the reweighting method called the standard deviation method.

Recently, more computationally robust methods that perform global optimization have been proposed. One such proposal is the MindReader retrieval system described in Ishikawa, Y., Subramanya R., and Faloutsos, C., "Mindreader: Query Databases Through Multiple Examples," In Proc. of the 24th VLDB Conference, (New York), 1998. It formulates a minimization problem on the parameter estimating process. Unlike traditional retrieval systems with a distance function that can be represented by ellipses aligned with the coordinate axis, the MindReader system proposed a distance function that is not necessarily aligned with the coordinate axis. Therefore, it allows for correlations between attributes in addition to different weights on each component.

A further improvement over this approach is described in Rui, Y., Huang, T. S. "A Novel Relevance Feedback Technique in Image Retrieval," ACM Multimedia, 1999. Their CBIR system not only formulates the optimization problem but also takes into account the multi-level image model.

All the approaches described above perform relevance feedback at the low-level feature vector level in image retrieval, but fail to take into account any semantics for the images themselves. The inherent problem with these approaches is that adopting relevance feedback used in text information retrieval to image retrieval does not prove to be as successful as hoped. This is primarily because low-level features are often not as powerful in representing complete semantic content of images.

As a result, there have been efforts on incorporating semantics in relevance feedback for image retrieval. In Lee, Ma, and Zhang, "Information Embedding Based on User's Relevance Feedback for Image Retrieval," Technical Report HP Labs, 1998, the authors propose a framework that attempts to embed semantic information into a low-level feature-based image retrieval process using a correlation matrix. In this framework, semantic relevance between image clusters is learned from a user's feedback and used to improve the retrieval performance.

There remains, however, need for improvement in the image retrieval systems and methods that utilize relevance feedback. The inventors propose a system that integrates both semantics and low-level features into the relevance feedback process in a new way. Only when the semantic information is not available is the technique reduced to one of the previously described low-level feedback approaches as a special case.

SUMMARY

An image retrieval system performs both keyword-based and content-based image retrieval. A user interface allows a user to specify a query using a combination of keywords and examples images. Depending on the input query, the image retrieval system finds images with keywords that match the keywords in the query and/or images with similar low-level features, such as color, texture, and shape. The system ranks the images and return them to the user.

The user interface allows the user to identify images that are more relevant to the query, as well as images that are less or not relevant. The image retrieval system monitors the user feedback and uses it to refine any search efforts and to train itself for fixture search queries.

In the described implementation, the image retrieval system seamlessly integrates feature-based relevance feedback and semantic-based relevance feedback. With feature-based relevance feedback, the system learns which low-level features led to relevant images and groups such features together to aid future searches.

With semantic-based relevance feedback, the image retrieval system learns which keywords are identified with the relevant images and strengthens the associations between the keywords and images. More specifically, the images and keywords are maintained in a database and a semantic network is constructed on top of the image database to define associations between the keywords and images and updated when user feedbacks are provided. Weights are assigned to the keyword-image associations to indicate how relevant the keyword is to the image. The weights are adjusted according to the user feedback, thereby strengthening associations between keywords and images identified as more relevant and weakening the associations between keywords and images identified as less relevant.

DETAILED DESCRIPTION

This disclosure describes an image retrieval system that performs both keyword-based and content-based image retrieval. The system seamlessly integrates feature-based relevance feedback and semantic-based relevance feedback. The image retrieval system also supports a semantic network constructed on top of an image database to associate keywords with images and employs machine learning to adapt the semantic network based on user feedback.

The image retrieval architecture is described in the context of an Internet-based system in which a server hosts the image retrieval system and clients submit user queries to the server. However, the architecture may be implemented in other environments. For instance, the image retrieval architecture may be implemented in non-Internet-based client-server systems or on a non-networked computer system.

Exemplary Computing Environment

Figure 1:
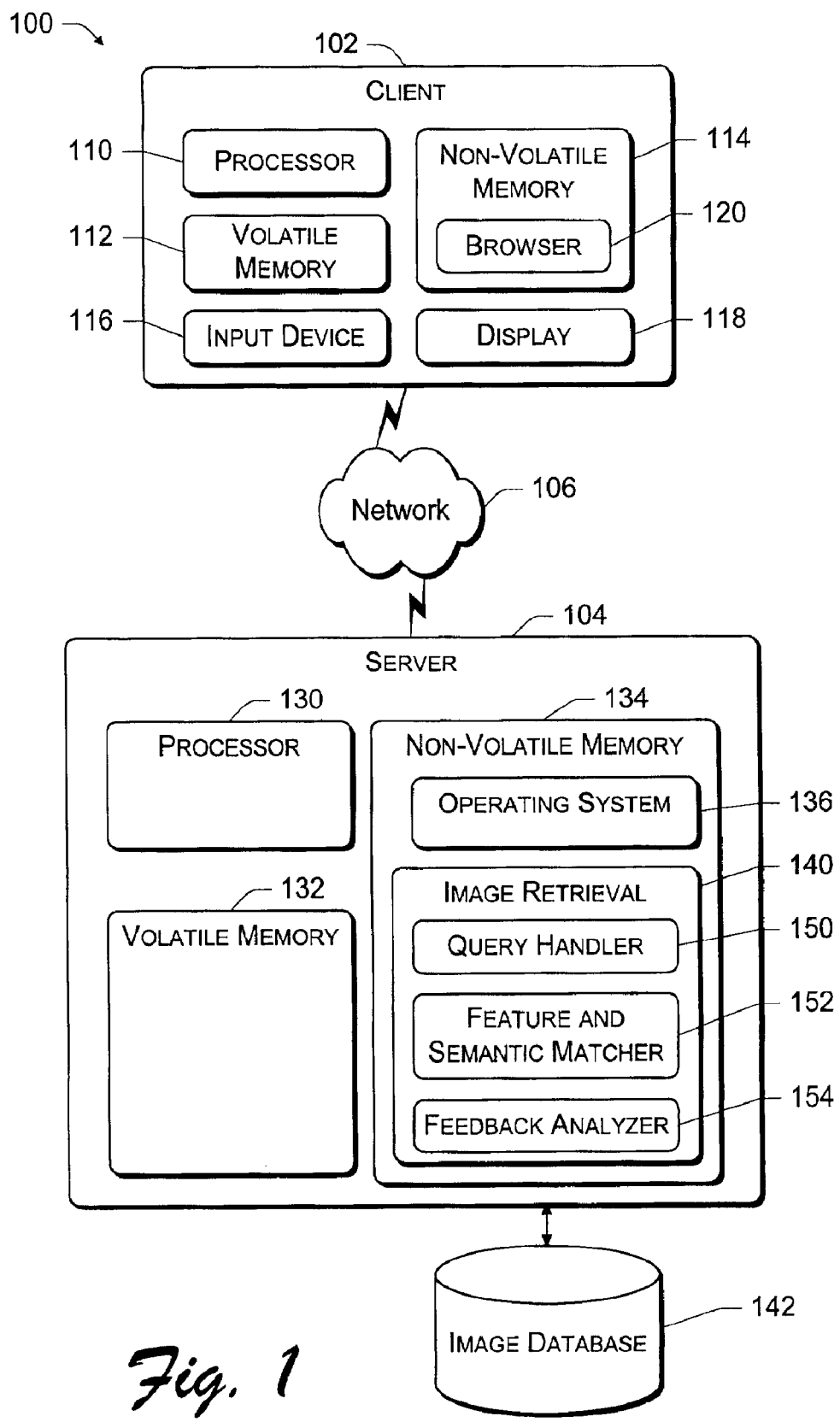
FIG. 1 is a block diagram of an exemplary computer network in which a server computer implements an image retrieval system that may be accessed over a network by one or more client computers.

FIG. 1 shows an exemplary computer network system 100 in which the image retrieval system may be implemented. The network system 100 includes a client computer 102 that submits queries to a server computer 104 via a network 106, such as the Internet. While the image retrieval system can be implemented using other networks (e.g., a wide area network or local area network) and should not be limited to the Internet, the system will be described in the context of the Internet as one suitable implementation. The web-based retrieval system allows multiple users to perform retrieval tasks simultaneously at any given time.

The client 102 is representative of many diverse computer systems, including general-purpose computers (e.g., desktop computer, laptop computer, etc.), network appliances (e.g., set-top box (STB), game console, etc.), and the like. The client 102 includes a processor 110, a volatile memory 112 (e.g., RAM), and a non-volatile memory 114 (e.g., ROM, Flash, hard disk, optical, etc.). The client 102 also has one or more input devices 116 (e.g., keyboard, keypad, mouse, remote control, stylus, microphone, etc.) and a display 118 to display images returned from the image retrieval system.

The client 102 is equipped with a browser 120, which is stored in non-volatile memory 114 and executed on processor 110. The browser 120 submits requests to and receives responses from the server 104 via the network 106. For discussion purposes, the browser 120 may be configured as a conventional Internet browser that is capable of receiving and rendering documents written in a markup language, such as HTML (hypertext markup language). The browser may further be used to present the images on the display 118.

The server 104 is representative of many different server environments, including a server for a local area network or wide area network, a backend for such a server, or a Web server. In this latter environment of a Web server, the server 104 may be implemented as one or more computers that are configured with server software to host a site on the Internet 106, such as a Web site for searching.

The server 104 has a processor 130, volatile memory 132 (e.g., RAM), and non-volatile memory 134 (e.g., ROM, Flash, hard disk, optical, RAID memory, etc.). The server 104 runs an operating system 136 and an image retrieval system 140. For purposes of illustration, operating system 136 and image retrieval system 140 are illustrated as discrete blocks stored in the non-volatile memory 134, although it is recognized that such programs and components reside at various times in different storage components of the server 104 and are executed by the processor 130. Generally, these software components are stored in non-volatile memory 134 and from there, are loaded at least partially into the volatile main memory 132 for execution on the processor 130.

The image retrieval system 140 searches for images stored in image database 142. The image retrieval system 140 includes a query handler 150, a feature and semantic matcher 152, and a feedback analyzer 154.

The query handler 150 handles queries received from the client 102. The queries may be in the form of natural language queries, individual word queries, or image queries that contains low-level features of an example image that forms the basis of the search. Depending on the query type, the query handler 150 initiates a keyword or feature-based search of the image database 142.

The feature and semantic matcher 152 attempts to find images in image database 142 that contain low-level features resembling the example image and/or have associated keywords that match keywords in the user query. The feature and semantic matcher 152 utilizes a semantic network to locate images with similar keywords. The semantic network defines associations between the keywords and images. Weights are assigned to the associations to indicate how relevant certain keywords are to the images. One exemplary semantic network is described below in more detail with reference to FIG. 3.

The feature and semantic matcher 152 rank the images according to their relevance to the query and return the images in rank order for review by the user. Via a user interface, the user can mark or otherwise identify individual images as more relevant to the query or as less or not relevant to the query.

The feedback analyzer 154 monitors the user feedback and analyzes which images are deemed relevant to the search and which are not. The feedback analyzer 154 uses the relevance feedback to train the semantic network in the image database. For instance, the feedback analyzer 154 can modify the annotations on relevant images to more closely comply with the keywords in the search query. The analyzer 154 may also adjust the weights of the semantic network by strengthening associations among keywords of the search query and relevant images, and weakening associations among keywords and non-relevant images.

Accordingly, the image retrieval system seamlessly integrates content-based image retrieval (CBIR) and semantic-based image retrieval. The system also integrates semantic and feature-based relevance feedback. The system yields tremendous advantages in terms of both retrieval accuracy and ease of use.

Image Retrieval System Architecture

Figure 2:
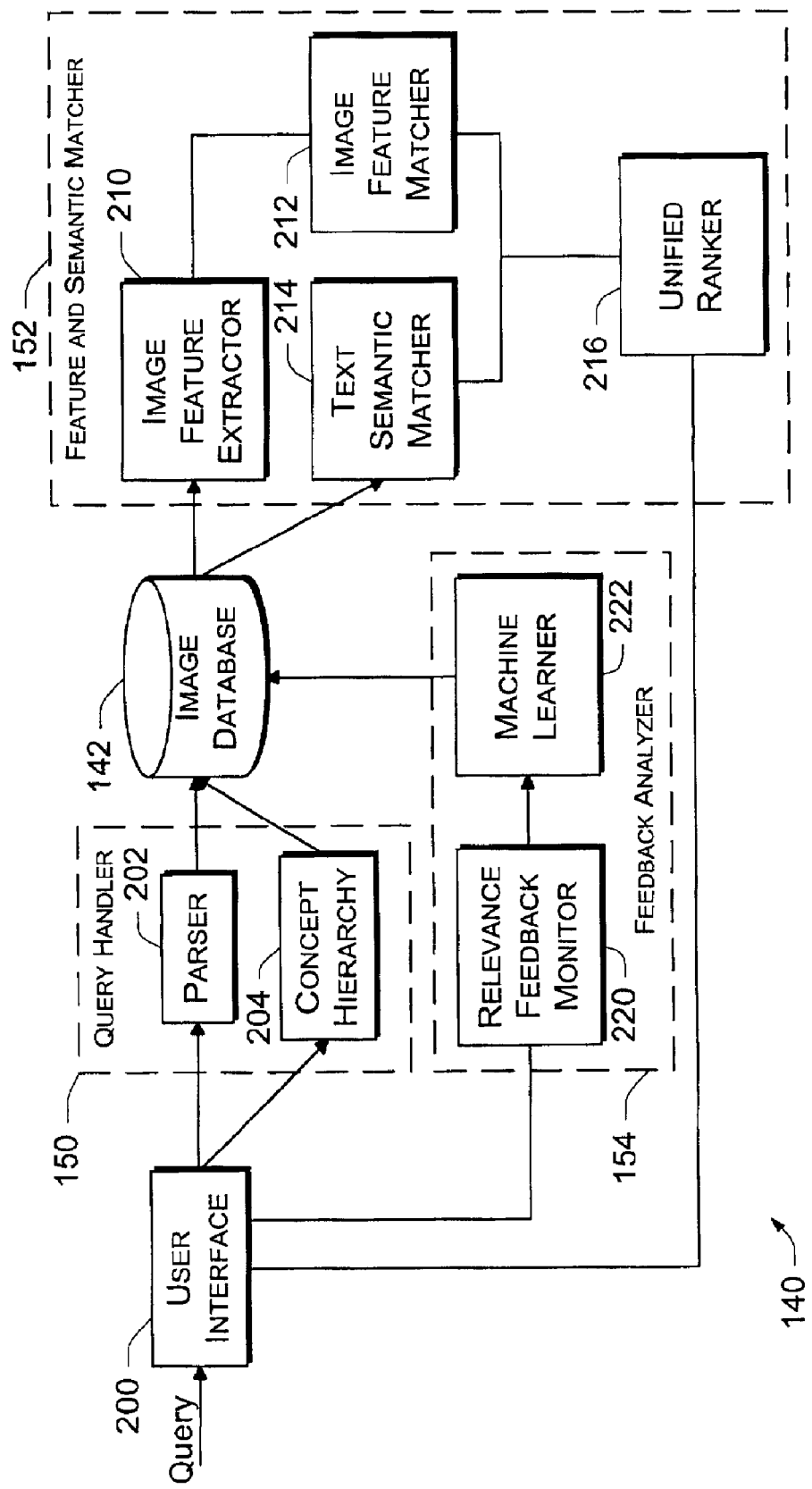
FIG. 2 is a block diagram of the image retrieval system architecture.

FIG. 2 illustrates the image retrieval system architecture 140 in more detail. It has a user interface (UI) 200 that accepts both text-based keyword or natural language queries and selection of example images. Thus, a user may choose to enter words or select an example image to use as the initial search query. The UI 200 also provides navigation tools to allow the user to browse through multiple images. In the FIG. 1 network system, the UI 200 can be served as an HTML document and rendered on the client display. One exemplary implementation of the user interface 200 is described below in more detail beneath the heading "User Interface".

The query is passed to the query handler 150. In the illustrated implementation, the query handler 150 includes a natural language parser 202 to parse text-based queries, such as keywords, phrases, and sentences. The parser 202 is configured to extract keywords from the query, and may utilize syntactic and semantic information from natural language queries to better understand and identify keywords. The parsed results are used as input to the semantic network that associates keywords with images in the database 142.

Figure 3:
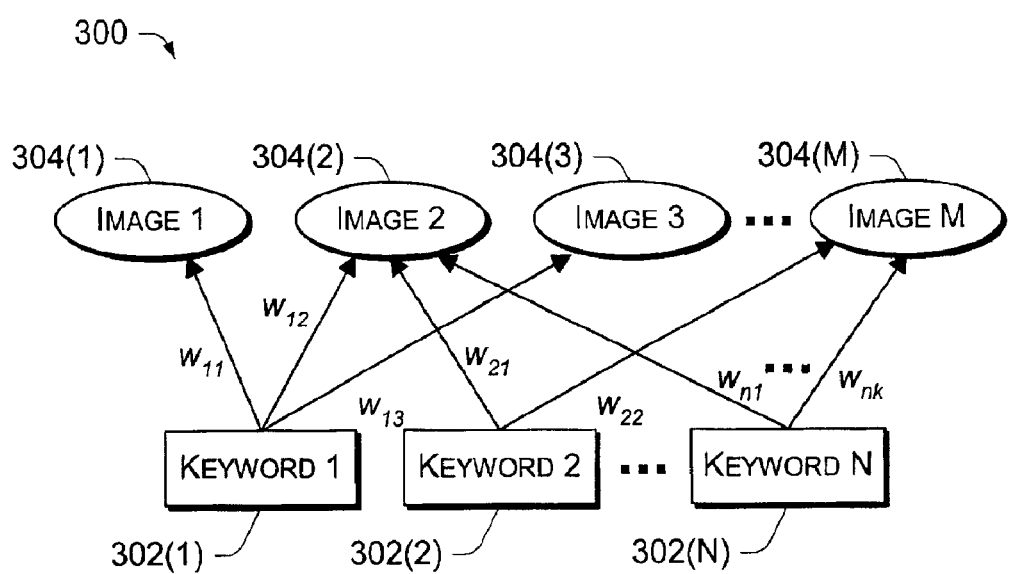
FIG. 3 illustrates a semantic network that represents relationships between keywords and images.

FIG. 3 pictorially illustrates a semantic network 300. The network defines keyword-image links that associate keywords 302(1), 302(2), . . . 302(N) with images 304(1), 304(2), 304(3), . . . , 304(M) in the database 142. The keyword-image links are illustrated as arrows. Weights w are assigned to each individual link to represent the degree of relevance in which a keyword describes the linked image's semantic content. For example, the first keyword 302(1) is associated with three images 304(1)–304(3) and the association with the first image 304(1) is assigned a weight $w_{11}$, the association with the second image 304(2) is assigned a weight $w_{12}$, and the association with the third image 304(3) is assigned a weight $w_{13}$.

Keyword-image associations may not be available at the beginning. However, there are several ways to obtain such associations. The first method is to simply manually label images and assign strong weights to the keyword-image link. This method can be expensive and time consuming.

To reduce the cost of manual labeling, an automatic approach may be employed. One possible approach is to leverage the Internet and its countless number of users by implementing a crawler that visits different websites and download images. The data pertaining to the image, such as the file name and the ALT tag string within the IMAGE tags of the HTML files, are saved as keywords and associated with the downloaded image. Also, the link string and the title of the page may be somewhat related to the image and hence used as possible keywords. Weights are then assigned to these keyword-image links according to their relevance. Heuristically, this information is listed in order of descending relevance: (1) link string, (2) ALT tag string, (3) file name, and (4) title of the page.

Another approach to incorporate additional keywords into the system is to utilize the user's input queries. Whenever the user feeds back a set of images marked as being relevant to the query, the input keywords are added into the system and linked with the images in the set. In addition, since the user indicates that these images are relevant, a large weight can be assigned on each of the newly created links. This latter approach is described below in more detail with reference to FIG. 5.

With reference again to FIG. 2, there may be a situation where the user does not wish to enter a text query. Instead, the user is interested in selecting an example image and searching for similar images. To accommodate this scenario, the user interface 200 presents a set of image categories from which the user may choose. Upon selection of a category, the image retrieval system returns a sample set of images pertaining to the category.

The image retrieval system accommodates this scenario with a predefined concept hierarchy 204 in query handler 150. The selected category is passed to the concept hierarchy 204, which identifies first level images corresponding to the category from the image database 142. From the sample images, the user can identify an image as the example image. The low-level features of the example image are then used to initiate a content-based image retrieval operation.

The feature and semantic matcher 152 identify images in image database 142 that have keywords associated with the user query and/or contain low-level features resembling the example image. The feature and semantic matcher 152 includes an image feature extractor 210 that extracts low-level features from the candidate images in the image database 142. Such low-level features include color histogram, texture, shape, and so forth. The feature extractor 210 passes the features to an image feature matcher 212 to match the low-level features of the candidate images with the low-level features of the example image submitted by the user. Candidate images with more similar features are assigned a higher rank.

For text queries, the feature and semantic matcher 152 has a semantic matcher 212 to identify images with associated keywords that match the keywords from the query. The semantic matcher 214 uses the semantic network to locate those images with links to the search keywords. Candidate images with higher weighted links are assigned a higher rank.

A ranking module 216 ranks the images such that the highest-ranking images are returned to the user as the preferred results set. The ranking takes into account the weightings assigned to keyword-image links as well as the closeness in features between two images. The set of highest-ranked images are returned to the user interface 200 and presented to the user for consideration.

The user interface 200 allows the user to mark images as more or less relevant, or entirely irrelevant. The feedback analyzer 154 monitors this user feedback. A relevance feedback monitor 220 tracks the feedback and performs both semantic-based relevance feedback and low-level feature relevance feedback in an integrated fashion. Generally, the relevance feedback monitor 220 adjusts the weights assigned to keyword-image links to train the semantic-based retrieval model and uses query point movement or re-weighting techniques to improve the feature-based retrieval model. The feedback analyzer 154 implements a machine learning algorithm 222 to adjust the semantic network and/or images in the database according to the relevance feedback. One particular implementation of an integrated framework for semantic-based relevance feedback and feature-based relevance feedback is described below in more detail under the heading "Integrated Relevance Feedback Framework".

The image retrieval system 140 offers many advantages over conventional systems. First, it locates images using both keywords and low-level features, thereby integrating keyword-based image retrieval and content-based image retrieval. Additionally, it integrates both semantic-based relevance feedback and feature-based relevance feedback.

Image Retrieval Process

Figure 4:
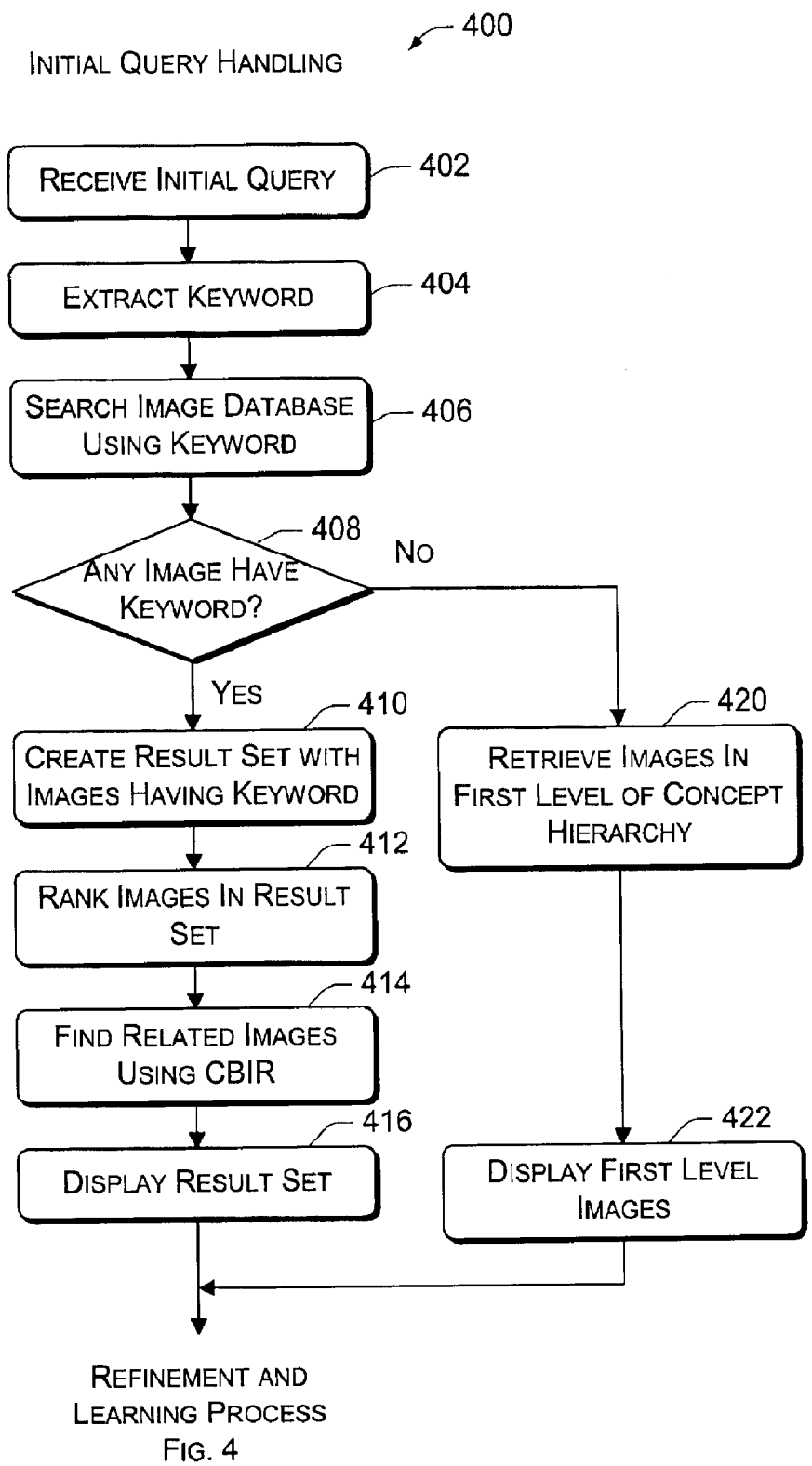
FIG. 4 is a flow diagram of an initial query handling process in which a user initially submits a keyword query for an image.
Figure 5:
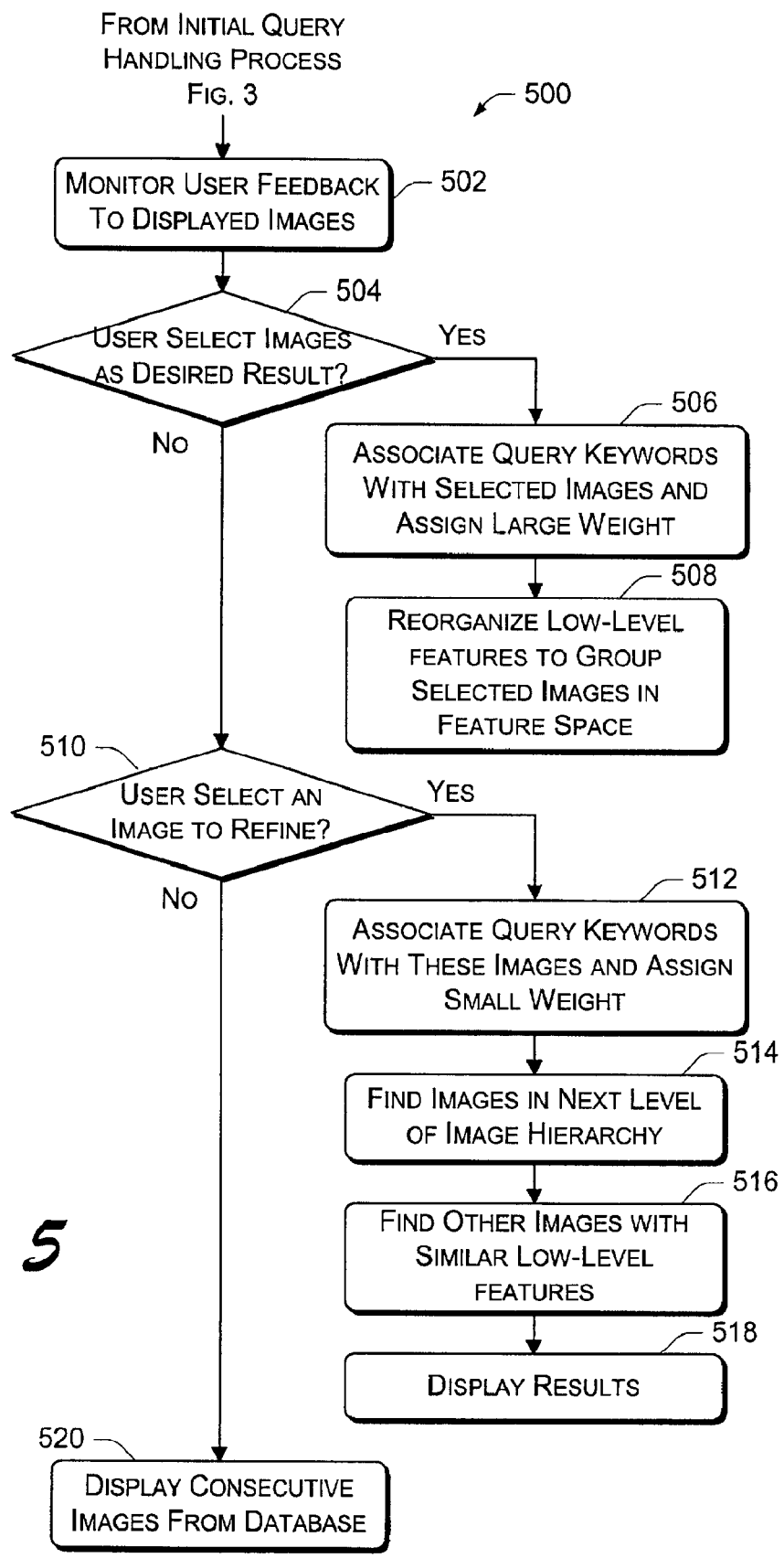
FIG. 5 is a flow diagram of a refinement and learning process in which the image retrieval system learns from the user's feedback pertaining to how relevant the images are to the initial query.

FIGS. 4 and 5 show an image retrieval process implemented by the image retrieval system 140 of FIG. 2. The process entails a first phase for producing an image result set from an initial query (FIG. 4) and a second phase for refining the result set and learning from the results and user feedback (FIG. 5). In one implementation, the image retrieval process is implemented as computer executable instructions that, when executed, perform the operations illustrated as blocks in FIGS. 4 and 5.

In one implementation, the process assumes that a coarse concept hierarchy of the available images exists, although this assumption is not necessary. For instance, images of people may be coarsely annotated generally as "people" and more particularly as "men" and "women". In addition, the low-level features of the images in the image database 142 may be calculated offline and correlated with the images through a data structure. This removes any potential slowdown caused by computing low-level features during the image retrieval process.

At block 402, the image retrieval system 140 receives an initial query submitted by a user via the user interface 200. Suppose the user enters a search query to locate images of "tigers". The user may enter any of the following queries:

"tigers"
"tiger pictures"
"Find pictures of tigers"
"I'm looking for images of tigers."

At block 404, the query handler 150 parses the user query to extract one or more keywords. In our example, the keyword "tiger" can be extracted from anyone of the queries. Other words, such as "pictures" and "images" may also be extracted, but we'll focus on the keyword "tiger" for illustration purposes.

At block 406, the image retrieval system 140 searches the image database 142 to identify images annotated with the keyword "tiger". The system may also simultaneously search of similar words (e.g., cat, animal, etc.). If any images in the database have a link association with the keyword (i.e., the "yes" branch from block 408), those images are placed into a result set (block 410). The images in the result set are then ranked according to the weights assigned to the keyword-image links in the semantic network (lock 412). Having identified a set of images that match the keyword, the features and semantic matcher 152 may also attempt to find other images with similar low-level features as those in the result set (block 414). Any such images are then added to the result set. The expanded result set is then displayed to the user via the user interface 200 (block 416).

It is noted that while such additional images may resemble other images in the original result set, certain images discovered via low-level feature comparison may have nothing to do with the search keyword. That is, operation 414 may return images that resemble the color or texture of another image with a tiger, but have no trace of a tiger anywhere in the image.

Returning to block 408, if the initial keyword search fails to locate any images (i.e., the "no" branch from block 408), the image retrieval system 140 retrieves images in a first level of the concept hierarchy (block 420). These images may be randomly selected from one or more categories in the hierarchy. The images are displayed to the user to suggest possible example images (block 422).

After the initial query, the image retrieval system 140 can use the results and user feedback to refine the search and train the retrieval model. The refinement and learning process is illustrated in FIG. 5.

At block 502, the feedback analyzer 154 monitors the user feedback to the images in the result set. The user may mark or otherwise indicate one or more images as relevant to the search query. This can be done, for example, through a user interface mechanism in which the user evaluates each image and activates (e.g., by a point-and-click operation) a positive mark or a negative mark associated with the image. The positive mark indicates that the image is more relevant to the search, whereas the negative mark indicates that the image is less or not relevant to the search.

From the results, the user may see certain images that he/she deems relevant to the query and select the images to produce a desired set (i.e., the "yes" branch from block 504). In this situation, the keywords in the original query are associated with the user-selected images and a large weight is assigned to the association link (block 506). A large weight is assigned to the link because there is a higher confidence that the search is accurate when high-level keywords are used to identify images. In one implementation, the weights are additive. Thus, an initial link might be assigned a value of "1" to indicate an association. If the keyword is subsequently associated with the image via searching, the weight may be incremented by "1", such that over time, the weight increases in strength.

At block 508, the similar low-level features correlated with these images are reorganized to be closer together in feature space. Then, for subsequent searches, the system will better understand the user's intention for certain images given the same keyword.

If the user does not see a set of images that are relevant to the search query (i.e., the "no" branch from block 504), the user may select an example image and refine the search to locate other images that have similar features to those of the selected image (block 510). When an example image is selected (i.e., the "yes" branch from block 510), the keywords in the original query are associated with the user-selected images and a small weight is assigned to the association link (block 512). A small weight is assigned to the link because there is less confidence that low-level image similarities produce a result as accurate as the result produced by keyword matches.

In response to user selection of an example image for refinement, the query handler 150 attempts to find other representative images in the next level of concept hierarchy (block 514). The feature and semantic matcher 152 also try to locate images that have similar low-level features as the example image selected by the user (block 516). The resulting set of images is then displayed-to the user (block 518).

Is Block 520 accounts for the situation where the original query did not return any relevant images, nor did the user find an image to refine the search. In this situation, the image retrieval system simply outputs images in the database one page at a time to let the user browse through and select the relevant images to feed back into the system.

User Interface

The image retrieval system 140 supports three modes of user interaction: keyword-based search, search by example images, and browsing the image database using a predefined concept hierarchy. The user interface 200 accommodates these three modes.

Figure 6:
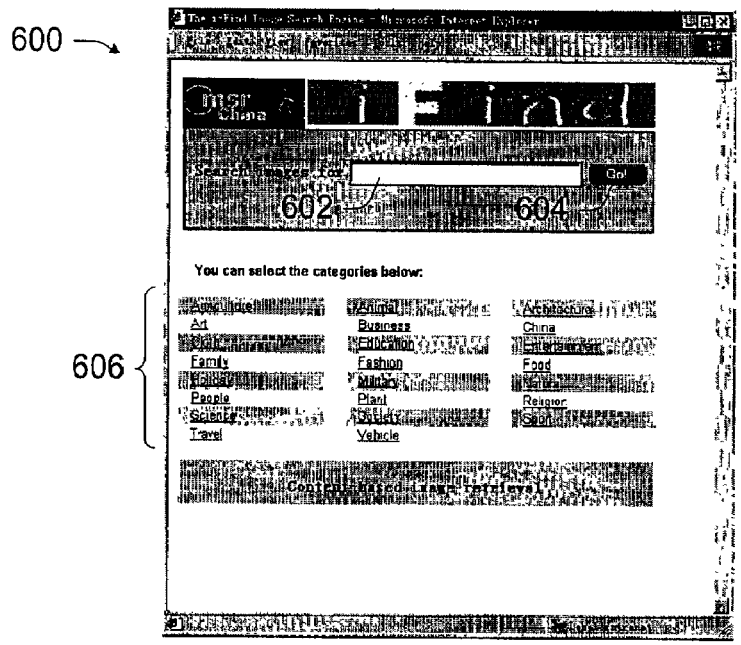
FIG. 6 illustrates a first screen view of a user interface for the image retrieval system.

FIG. 6 shows an example of a query screen 600 presented by the user interface 200 for entry of an initial query. The screen display 600 presents a natural language text entry area 602 that allows user to enter keywords or phrases. After entering one or more keywords, the user actuates a button 604 that initiates the search for relevant images. Alternatively, the user can browse a predefined concept hierarchy by selecting one of the categories listed in section 606 of the query screen 600. The user actuates the category link to initiate a search for images within the category.

The results of the keyword or content-based image retrieval are presented in a next screen. For discussion purposes, suppose the user enters the keyword "tiger" into the text entry area 602 of query screen 600.

Figure 7:
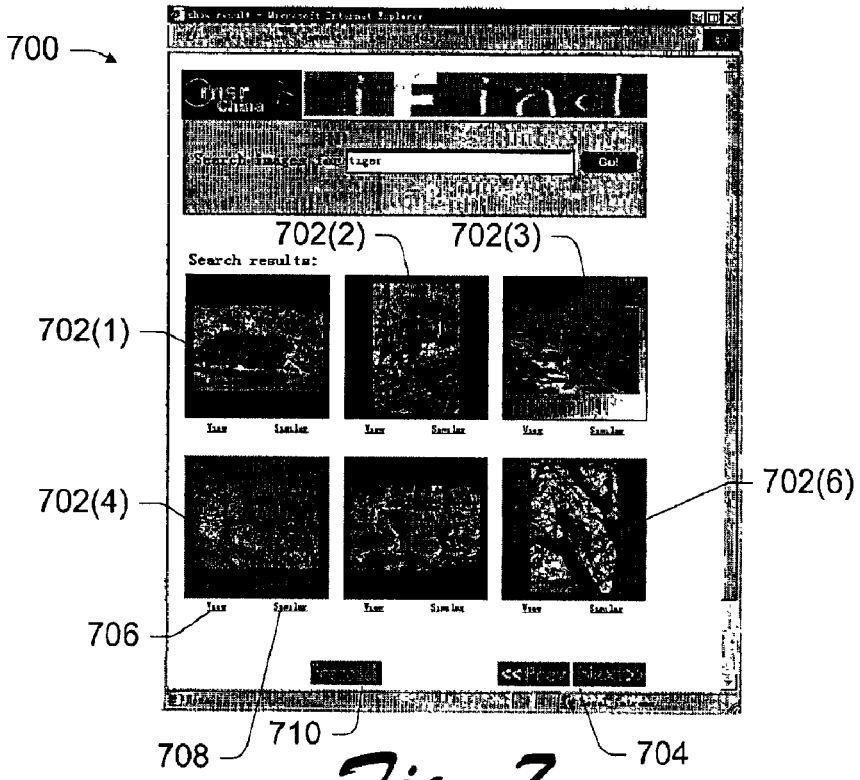
FIG. 7 illustrates a second screen view of the user interface for the image retrieval system.

FIG. 7 shows an example results screen 700 presented in response to entry of the keyword "tiger". Depending on display size, one or more images are displayed in the results screen 700. Here, six images 702(1)–702(6) are displayed at one time. If there are more images than can be displayed simultaneously, navigation "Next" and "Prev" buttons 704 are presented to permit browsing to other images in the result set.

The user interface allows the user to feedback relevance information as he/she browses the images. Each image has several feedback options. For instance, each image has a "View" link 706 that allows the user to enlarge the image for better viewing. Activation of a "Similar" link 708 initiates a subsequent query for images with both similar semantic content and similar low-level features as the corresponding image. This refined search will be presented in the next screen.

Furthermore, each image has both positive and negative relevance marks that may be individually selected by the user. The relevance marks allow the user to indicate on an image-by-image basis, which images are more relevant to the search query and which are less relevant. Examples of such marks include a "+" and "−" combination, or a "thumbs up" and "thumbs down", or a change in background color (e.g., red means less relevant, blue means more relevant).

In FIG. 7, images 702(1), 702(2), and 702(5) are marked with a blue background, indicating a positive match that these images do in fact represent tigers. Images 702(4) and 702(6) have a red background, indicating that the do not match the query "tiger". Notice closely that these images contain leopards and not tigers. Finally, image 702(3) has a gradient background (neither positive nor negative) and will not be considered in the relevance feedback. This image presents a wolf, which has essentially no relevance to tigers.

Is After providing relevant feedback, the user activates the "Feedback" button 710 to submit the feedback to the feedback analyzer 154. The learning begins at this point to improve the image retrieval process for future queries.

Integrated Relevance Feedback Framework

This section described on exemplary implementation of integrating semantic-based relevance feedback with low-level feature-based relevance feedback. Semantic-based relevance feedback can be performed relatively easily compared to its low-level feature counterpart. One exemplary implementation of semantic-based relevance feedback is described first, followed by how this feedback can be integrated with feature-based relevance feedback.

For semantic-based relevance feedback, a voting scheme is used to update the weights $w_{ij}$ associated with each link in the semantic network 300 (FIG. 3). The weight updating process is described below.

Step 1: Initialize all weights $w_{ij}$ to 1. That is, every keyword is initially given the same importance.

Step 2: Collect the user query and the positive and negative feedback examples.

Step 3: For each keyword in the input query, check if any of them is not in the keyword database. If so, add the keyword(s) into the database without creating any links.

Step 4: For each positive example, check if any query keyword is not linked to it. If so, create a link with weight "1" from each missing keyword to this image. For all other keywords that are already linked to this image, increment the weight by "1".

Step 5: For each negative example, check to see if any query keyword is linked with it. If so, set the new weight $w_{ij}=w_{ij}/4$. If the weight $w_{ij}$ on any link is less than 1, delete that link.

It can be easily seen that as more queries are input, the system is able to expand its vocabulary. Also, through this voting process, the keywords that represent the actual semantic content of each image are assigned larger weights. It should be noted, however, that the above weight update scheme is just one of many reasonable ones.

As noted previously, the weight $w_{ij}$ associated on each keyword-image link represents the degree of relevance in which this keyword describes the linked image's semantic content. For retrieval purposes, another consideration is to avoid having certain keywords associated with a large number of images in the database. The keywords with many links to many images should be penalized. Therefore, a relevance factor $r_k$ of the $k^{th}$ keyword association be computed as follows:

$$r_k = w_k \left( \log_2 \frac{M}{d_i} + 1 \right) \quad (2)$$

where M is the total number of images in the database, $w_k=w_{mn}$ if m=i and 0 otherwise, and $d_i$ is the number of links that the $i^{-th}$ keyword has.

Now, the above semantic-based relevance feedback needs to be integrated with the feature-based relevance feedback. It is known from previous research (See, Rui, Y., Huang, T. S. "A Novel Relevance Feedback Technique in Image Retrieval," ACM Multimedia, 1999) that the ideal query vector $q_i^*$ for feature i is the weighted average of the training samples for feature i given by:

$$q_i^{T^*} = \frac{\pi^T X_t}{\sum_{n=1}^{N} \pi_n} \quad (3)$$

where $X_i$ is the $N \times K_i$ training sample matrix for feature i, obtained by stacking the 25 N training vectors $x_{ni}$ into a matrix, and where N is an element vector $\pi = [\pi_1 \ldots \pi_N]$ that represents the degree of relevance for each of the N input training samples. The optimal weight matrix $W_i^*$ is given by:

$$W_i^* = (det(C_i))^{\frac{1}{K_i}} C_i^{-1} \quad (4)$$

where $C_i$ is the weighted covariance matrix of $X_i$. That is:

$$C_{i_{rs}} = \frac{\sum_{n=1}^{N} \pi_n (x_{nir} - q_{ir})(x_{nis} - q_{is})}{\sum_{n=1}^{N} \pi_n} \quad r, s = 1, \ldots K_i \quad (5)$$

The critical inputs into the system are xi and σr. Initially, the user inputs these data to the system. However, this first step can be eliminated by automatically providing the system with this initial data. This is done by searching the semantic network for keywords that appear in the input query. From these keywords, the system follows the links to obtain the set of training images (duplicate images are removed). The vectors $x_{ni}$ can be computed easily from the training set. The degree of relevance vector iris computed as follows:

$$\pi_i = a^M \sum_{j=1}^{M} r_{ij} \quad (6)$$

where M is the number of query keywords linked to the training image i, $r_{jk}$ is the relevance factor of the $j^{-th}$ keyword associated with image i, and a>1 is a suitable constant. The degree of relevance of the $i^{-th}$ image increases exponentially with the number of query keywords linked to it. In the one implementation, an experimentally determined setting of α=2.5 yielded the best results.

To incorporate the low-level feature based feedback and ranking results into high-level semantic feedback and ranking, a unified distance metric function $G_j$ is defined to measure the relevance of any image within the image database in terms of both semantic and low-level feature content. The function $G_j$ is defined using a modified form of the Rocchio's formula (See Background) as follows:

$$G_j = \log(1 + \pi_j)D_j + \quad (7)$$
$$\beta \left\{ \frac{1}{N_R} \sum_{k \in N_R} \left[ \left(1 + \frac{I_1}{A_1}\right) S_{jk} \right] \right\} - \gamma \left\{ \frac{1}{N_N} \sum_{k \in N_N} \left[ \left(1 + \frac{I_2}{A_2}\right) S_{jk} \right] \right\}$$

where $D_j$ is the distance score computed by the low-level feedback, $N_R$ and $N_N$ are the number of positive and negative feedbacks respectively, $I_1$ is the number of distinct keywords in common between the image j and all the positive feedback images, $I_2$ is the number of distinct keywords in common between the image and all the negative feedback images, $A_1$ and $A_2$ are the total number of distinct keywords associated with all the positive and negative feedback images respectively, and finally $S_{ij}$ is the Euclidean distance of the low-level features between the images i and j.

The first parameter α in Rocchio's formula is replaced with the logarithm of the degree of relevance of the $j^{-th}$ image. The other two parameters β and γ can be assigned a value of 1.0 for simplicity. However, other values can be given to emphasize the weighting difference between the last two terms.

Using the method described above, the combined relevance feedback is provided as follows.

Step 1: Collect the user query keywords

Step 2: Use the above method to compute $x_{ni}$ and π and input them into the low-level feature relevance feedback component to obtain the initial query results.

Step 3: Collect positive and negative feedbacks from the user.

Step 4: Update the weighting in the semantic network according to the step process described earlier in this section.

Step 5: Update the weights of the low-level feature based component.

Step 6: Compute the new $x_{ni}$ and π and input into the low-level feedback component. The values of $x_{ni}$ may be computed beforehand in a pre-processing step.

Step 7: Compute the ranking score for each image using equation 7 and sort the results.

Step 8: Show new results and go to step 3.

The image retrieval system is advantageous over prior art systems in that it learns from the user's feedback both semantically and in a feature based manner. In addition, if no semantic information is available, the process degenerates into conventional feature-based relevance feedback, such as that described by Rui and Huang in the above-cited "A Novel Relevance Feedback Technique in Image Retrieval".

New Image Registration

Adding new images into the database is a very common operation under many circumstances. For retrieval systems that entirely rely on low-level image features, adding new images simply involves extracting various feature vectors for the set of new images. However, since the retrieval system utilizes keywords to represent the images' semantic contents, the semantic contents of the new images have to be labeled either manually or automatically. In this section, an automatic labeling technique is described.

The automatic labeling technique involves guessing the semantic content of new images using low-level features. The following is an exemplary process:

Step 1: For each category in the database, compute the representative feature vectors by determining the centroid of all images within this category.

Step 2: For each category in the database, find the set of representative keywords by examining the keyword association of each image in this category. The top N keywords with largest weight whose combined weight does not exceed a previously determined threshold τ are selected and added into the list the representative keywords. The value of the threshold τ is set to 40% of the total weight.

Step 3: For each new image, compare its low-level feature vectors against the representative feature vectors of each category. The images are labeled with the set of representative keywords from the closest matching category with an initial weight of 1.0 on each keyword.

Because the low-level feature are not enough to present the images semantics, some or even all of the automatically labeled keywords will inevitably be inaccurate. However, through user queues and feedbacks, semantically accurate keywords will emerge while semantically inaccurate keywords win to slowly be eliminated.

Another problem related to automatic labeling of new images is the automatic classification of these images into predefined categories. This problem is addressed by the following process:

Step 1: Put the automatically labeled new images into a special "unknown" category.

Step 2: At regular intervals, check every image in this category to see if any keyword association has received a weight greater than a threshold ξ. If so, extract the top N keywords whose combined weight does not exceed the threshold τ.

Step 3: For each image with extracted keywords, compare the extracted keywords with the list of representative keywords from each category. Assign each image to the closest matching category. If none of the available categories result in a meaningful match, leave this image in the "unknown" category.

The keyword list comparison function used in step 3 of the above algorithm can take several forms. An ideal function would take into account the semantic relationship of keywords in one list with those of the other list. However, for the sake of simplicity, a quick function only checks for the existence of keywords from the extracted keyword list in the list of representative keywords.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. A method comprising: initiating a search for images based on at least one query keyword in a query; identifying, during the search, first images having associated keywords that match the query keyword, and second images that contain low-level features similar to those of the first images identified as matching the query keyword, wherein the low-levels features comprise color, shape, and texture and the low-level features do not match the search query;
   ranking the first and second images;
   presenting the first and second images to a user; and
   receiving feedback from the user as to whether the first and second images are relevant to the query further comprising:
   assigning a large weight to an association between the query keyword and the images deemed relevant by the user and/or assigning a small weight to an association between the query keyword and the example image.

2. A method as recited in claim 1, further comprising presenting the first and second images.

3. A method comprising:
   initiating a search for images based on at least one query keyword in a query;
   identifying, during the search, first images having associated keywords that match the query keyword, and second images that contain low-level features similar to those of the first images identified as matching the query keyword wherein the low-levels features comprise color, shape and texture and the low-level features do not match the search query;
   presenting the first and second images to a user;
   monitoring feedback from the user as to which of the first and second images are relevant to the query; and
   receiving feedback from the user as to whether the first and second images are relevant to the query comprising:
   assigning a large weight to an association between the query keyword and the images deemed relevant by the user and/or assigning a small weight to an association between the query keyword and the example image.

4. A method comprising:
   initiating a search for images based on at least one query keyword in a query;
   identifying, during the search, first images having associated keywords that match the query keyword, and second images that contain low-level features similar to those of the first images identified as matching the query keyword wherein the low-levels features comprise color, shape, and size and the low-level features do not match the search query;
   presenting the first and second images to a user;
   receiving feedback from the user as to whether the first and second images are relevant to the query;
   learning how the first and second images are identified based on the feedback from the user; and
   receiving feedback from the user as to whether the first and second images are relevant to the query further comprising:
   assigning a large, weight to an association between the query keyword and the images deemed relevant by the user and/or assigning a small weight to an association between the query keyword and the example image.

5. A method as recited in claim 1, wherein the monitoring comprises
   presenting the first and second images to a user;
   receiving feedback from the user as to whether the first and second images are relevant to the query further comprising:
   refining the search to identify additional images that contain low-level features similar to those of the images indicated by the user as being relevant to the a query.

6. A method as recited in claim 1, wherein the monitoring comprises
   presenting the first and second images to a user,
   receiving feedback from the user as to whether the first and second images are relevant to the query further comprising:
   assigning a large weight to an association between the query keyword and the images deemed relevant by the user.

7. A method as recited in claim 6, further comprising grouping the low-level features of the images deemed relevant by the user.

8. A method as recited in claim 1, wherein the monitoring comprises
   presenting the first and second images to a user;
   receiving feedback from the user as to whether the first and second images are relevant to the query further comprising;
   assigning a small weight to an association between the query keyword and the example image.

9. A method as recited in claims 8, further comprising identifying additional images with low-level features similar to those of the example image.

10. A computer readable medium having computer-executable instructions that, when executed on a processor, perform the method as recited in claim 1.

11. A method comprising:
    permitting entry of both keyword-based queries and content-based queries; finding a first set of images using semantic-based image retrieval and a second set of images using low-level feature-based image retrieval based on the first set of images wherein the low-levels features comprise color, shape and texture and the low-level features do not match the semantic-based and the low-level features do not match the keyword-based or content-based;

presenting the images to a user so that the user can indicate whether the images are relevant;

conducting semantic-based relevance feedback and low-level feature-based relevance feedback in an integrated fashion; and receiving feedback from the user as to whether the first and second images are relevant to the query further comprising:
  assigning a large weight to an association between the query keyword and the images deemed relevant by the user and/or assigning a small weight to an association between the query keyword and the example image.

12. A method as recited in claim 11, further comprising ranking images.

13. A method as recited in claim 11, further comprising using images indicated as being relevant to find additional images.

14. A computer readable medium having computer-executable instructions that, when executed on a processor, perform the method as recited in claim 11.

15. A method comprising:
  identifying the set of images from the presenting retrieved using the at least one keyword and second images that contain low-level features similar to those of the first images identified as matching the at least one keyword, wherein the low-levels features comprise color, shape and texture and the low-level features do not match the search query;
  presenting a result set of images that are returned from an image retrieval search of a query having at least one keyword;
  monitoring feedback from a user as to whether the images in the result set are relevant to the query;
  in an event that the user selects at least one image as being relevant to the query, associating the keyword in the query with the selected image to form a first keyword-image association and assigning a comparatively large weight to the first keyword-image association; and
  in an event that the user identifies an example image for refinement of the search, associating the keyword in the query with the example image to form a second keyword-image association and assigning a comparatively small weight to the second keyword-image association.

16. A method as recited in claim 15, further comprising conducting both content-based image retrieval and semantic-based image retrieval.

17. A method as recited in claim 15, further comprising presenting the result set of images in a user interface, the user interface facilitating the user feedback by allowing the user to indicate which images are more relevant and which images are less relevant.

18. A computer readable medium having computer-executable instructions that, when executed on a processor, perform the method as recited in claim 15.

19. An image retrieval system comprising:
  a query handler to handle both keyword-based queries having one or more search keywords and content-based queries having one or more low-level features of an image; and
  a feature and semantic matcher to identify at least one of (1) first images having keywords that match the search keywords from a keyword-based query, and (2) second images having low-level features similar to the low-level features of a content-based query based on the first images, wherein the feature and semantic matcher ranks the images, and the low-level features comprise color, shape and texture, and the low-level features do not match the keyword-based or content-based;
  presenting the first and second images to a user; and
  receiving feedback from the user as to whether the first and second images are relevant to the query further comprising:
    assigning a large weight to an association between the query keyword and the images deemed relevant by the user and/or assigning a small weight to an association between the query keyword and the example image.

20. An image retrieval system as recited in claim 19, wherein the query handler comprises a natural language parser.

21. An image retrieval system as recited in claim 19, wherein query handler comprises:
  a parser to parse textbased queries; and
  a concept hiearchy to define various categories of images.

22. An image retrieval system as recited in claim 19, further comprising a user interface to present the images identified by the feature and semantic matcher.

23. An image retrieval system comprising:
  a query handler to handle both keyword-based queries having one or more search keywords and content-based queries having one or more low-level features of an image;
  a feature and semantic matcher to identify at least one of (1) first images having keywords that match the search keywords from a keyword-based query, and (2) second images having low-level features similar to the low-level features of a content-based query based on the first images, wherein the low-level features comprise color, shape and texture and the low-level features do not match the keyword-based or the content-based;
  a user interface to present the images identified by the feature and semantic matcher to a user, the user interface allowing the user to indicate whether the images are relevant to the query; and
  a feedback analyzer to train the image retrieval system based on user feedback as to relevancy, wherein the feedback analyzer to assign a large weight to an association between the query keyword and the images deemed relevant by the user and/or feedback analyzer to assign a small weight to an association between the query keyword and the example image and/or a feedback analyzer to assign a small weight to an association between the search keywords and the example image.

24. An image retrieval system as recited in claim 19, further comprising:
  a user interface to present the images identified by the feature and semantic matcher to a user, the user interface allowing the user to identify an example image; and
  the feature and semantic matcher being configured to identify additional images that contain low-level features similar to those of the example image.

25. An image retrieval system as recited in claim 19, further comprising:
  a user interface to present the images identified by the feature and semantic matcher to a user, the user interface allowing the user to identify which images are relevant to a particular search query; and a feedback analyzer to assign a large weight to an association between the search keywords and the images identified as relevant by the user.

26. An image retrieval system as recited in claim 25, wherein the feedback analyzer groups the low-level features of the images identified as relevant by the user.

27. An image retrieval system as recited in claim 23, wherein the feature and semantic matcher identifies additional images with low-level features similar to those of the example image.

28. A computer-readable medium having computer-executable instructions that, when executed, directs a computer to: find a first set of images using both semantic-based image retrieval, and a second set of images using low-level feature-based image retrieval based on the first set of images, wherein the low-level features comprise color, shape and texture and the low-level features do not match the semantic-based or feature-based;

present the images to a user so that the user can indicate whether the images are relevant; and concurrently conduct semantic-based relevance feedback and low-level feature-based relevance feedback, wherein the receiving feedback from the user as to whether the first and second images are relevant to the query further comprising:

assigning a large weight to an association between the query keyword and the images deemed relevant by the user and/or assigning a small weight to an association between the query keyword and the example image.

29. A program as recited in claim 28, further comprising computer-executable instructions that, when executed, direct a computer to rank the images.

30. An information retrieval program, embodied on the computer-readable medium, comprising the computer-executable instructions of claim 28.

31. A computer readable medium having computer-executable instructions that, when executed on a processor, perform the method as recited in claim 3.

* * * * *